Patented Mar. 18, 1924.

1,487,109

UNITED STATES PATENT OFFICE.

THOMAS F. LACY, OF SIOUX CITY, IOWA.

STORAGE-BATTERY ELECTROLYTE.

No Drawing.    Application filed February 1, 1923.   Serial No. 616,402.

*To all whom it may concern:*

Be it known that I, THOMAS F. LACY, a citizen of the United States, and a resident of Sioux City, in the county of Woodbury and State of Iowa, have invented certain new and useful Improvements in Storage-Battery Electrolytes, of which the following is a specification.

My invention has for its object the production of an improved electrolytic solution for storage batteries which increases the efficiency and lengthens the life of a battery, and by the use of which a storage battery may be fully charged in a comparatively short time on a charging circuit.

These objects I attain in a solution which positively cannot injure the battery in any way, sulphation, disentegration and polarization of the plates and separators and the corrosion of the terminals and connectors being practically eliminated.

Furthermore, overcharging, freezing and overheating of the battery are prevented, which result in buckling of the plates and other evils.

My solution preferably consists of the following ingredients, preferably combined in the relative proportions stated, namely,—

|  | % in weight. |
|---|---|
| Sodium sulphate (Glauber salts) | $4\frac{1}{2}$ |
| Lead sulphate | $\frac{3}{16}$ |
| Sulphuric acid (chemically pure) | $95\frac{5}{16}$ |

The relative proportions of the ingredients are varied according to the condition and age of the battery in which the solution is to be used. The particular amount of variation in the proportion of sodium sulphate is not of such great importance as is the variation of the lead sulphate, the maximum amount of which (approximately $\frac{3}{8}\%$) may be used in real old batteries, and a minimum proportion of $\frac{1}{16}\%$ to $\frac{1}{4}\%$ is used in new batteries or batteries which are considered in real good condition. After the above ingredients have been mixed and the lead sulphate dissolved by agitating the mixture, water is added to the mixture until it has a specific gravity of 1.250 to 1.300 at 70 degrees Fahrenheit, the specific gravity of the solution being varied to suit the particular battery in which the solution is to be used.

In lieu of sodium sulphate, a like amount of sodium chloride (common salt) may be used, which, through the action of the sulphuric acid, is converted into sodium sulphate.

Having thus described my invention and presented a specific formula for practising the same, what I claim as new and desire to secure by Letters Patent of the United States, is,—

1. A storage battery electrolyte comprising sulphuric acid, sodium sulphate and lead sulphate.

2. A storage battery electrolyte comprising a mixture of sulphuric acid, sodium sulphate and lead sulphate, and sufficient distilled water added to said mixture to give it a specific gravity of at least 1.250.

3. A storage battery electrolyte comprising the following ingredients, combined, approximately, in the relative weights, as stated: sulphuric acid, $95\frac{5}{16}\%$, sodium sulphate, $4\frac{1}{2}\%$, and lead sulphate, $\frac{3}{16}\%$.

4. A battery electrolyte comprising a mixture including, by weight, approximately, sulphuric acid, $90\frac{5}{16}\%$, sodium sulphate, $4\frac{1}{2}\%$, and lead sulphate, $\frac{1}{16}\%$, and sufficient distilled water admixed therewith to bring the specific gravity to at least 1.250.

In testimony whereof, I have hereunto set my hand this 29th day of January, 1923.

THOMAS F. LACY.